United States Patent
Matlis et al.

(10) Patent No.: US 8,185,349 B2
(45) Date of Patent: *May 22, 2012

(54) PLASMA SENSORS AND RELATED METHODS

(75) Inventors: Eric Matlis, Mishawaka, IN (US); Scott Morris, Granger, IN (US); Thomas Corke, Granger, IN (US); Joshua Cameron, Granger, IN (US)

(73) Assignee: University of Notre Dame du Lac, Notre Dame, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/024,694

(22) Filed: Feb. 10, 2011

(65) Prior Publication Data

US 2011/0129328 A1 Jun. 2, 2011

Related U.S. Application Data

(63) Continuation of application No. 12/248,666, filed on Oct. 9, 2008, now Pat. No. 7,908,115.

(60) Provisional application No. 60/998,219, filed on Oct. 9, 2007.

(51) Int. Cl.
*G01F 1/58* (2006.01)

(52) U.S. Cl. .................................................... 702/181
(58) Field of Classification Search .................... 702/181
See application file for complete search history.

(56) References Cited

U.S. PATENT DOCUMENTS

| 5,082,421 | A | 1/1992 | Acton et al. |
| 5,141,391 | A | 8/1992 | Acton et al. |
| 5,275,528 | A | 1/1994 | Freeman et al. |
| 5,340,271 | A | 8/1994 | Freeman et al. |
| 6,098,010 | A | 8/2000 | Krener et al. |
| 6,793,455 | B2 | 9/2004 | Prasad et al. |
| 7,275,013 | B1 * | 9/2007 | Matlis et al. ............... 702/144 |
| 2006/0288703 | A1 | 12/2006 | Kurtz et al. |
| 2007/0126292 | A1 | 6/2007 | Lugg |
| 2008/0067283 | A1 | 3/2008 | Thomas |
| 2009/0065064 | A1 * | 3/2009 | Morris et al. .................. 137/2 |

FOREIGN PATENT DOCUMENTS

| WO | 98/55837 A1 | 12/1998 |
| WO | 2007/106863 A2 | 9/2007 |

OTHER PUBLICATIONS

Eric H. Matlis et al; "A.C. Plasma Anemometer for Hypersonic Mach Number Experiments", 2005 IEEE, pp. 245-256.

PCT International Search Report Issued by the International Search Authority Feb. 2, 2009 in connection with PCT/US2008/084717, (2 pages).

(Continued)

*Primary Examiner* — Cindy H Khuu
(74) *Attorney, Agent, or Firm* — Keith R. Jarosik

(57) ABSTRACT

Plasma sensors, systems and related methods are described. An example method for predicting an event includes providing a carrier signal across two electrodes and forming a plasma between the two electrodes. The example method also includes measuring a modulated signal from the plasma, manipulating the modulated signal to produce a value and comparing the value to a threshold. Finally, the example method includes determining the likelihood of the event based on the comparison.

20 Claims, 13 Drawing Sheets

OTHER PUBLICATIONS

PCT Written Opinion of International Search Authority, issued by International Search Authority on Feb. 2, 2009 in connection with PCT/US2008/084717, (4 pages).

USPTO Supplemental NOA mailed Jan. 11, 2011 in connection with U.S. Appl. No. 12/248,666.

USPTO Supplemental NOA mailed Jan. 3, 2001 in connection with U.S. Appl. No. 12/248,666.

USPTO NOA mailed Nov. 10, 2010 in connection with U.S. Appl. No. 12/248,666.

USPTO OA mailed Apr. 29, 2010 in connection with U.S. Appl. No. 12/248,666.

* cited by examiner

PLASMA SENSORS AND RELATED METHODS

CROSS REFERENCE TO RELATED APPLICATION

This application is a continuation of U.S. patent application Ser. No. 12/248,666, filed Oct. 9, 2008 and now U.S. Pat. No. 7,908,115, which is a non-provisional application claiming priority from U.S. Provisional Application Ser. No. 60/998,219, filed Oct. 9, 2007, entitled "Plasma Sensor for Stall Precursor Detection in Gas-Turbine Engines," each of which are incorporated herein by reference in their entirety.

FIELD OF THE DISCLOSURE

The present disclosure relates generally to measurement systems and, more particularly, to plasma sensors and related methods of use.

BACKGROUND OF RELATED ART

The safety and efficiency of axial flow fans and compressors, such as, for instance, gas turbine engines are typically limited, in part, by the performance of the compressors that supply high pressure air for combustion. Gas turbine engines are subject to rotating stall in the compressor section during operation, which is of particular concern to aircraft designers. Stall has a negative impact on the overall performance of the engine including the ability to attain maximum fuel efficiency. As there are no known diagnostic sensors available to the engine operator to predict incipient stall, the engine must be operated with fuel management strategies that maintain the compressor at safe stall margins over a wide range of operating pressures and speeds. Operating the engine at these conservative settings typically prevent the engine from attaining maximum performance and efficiency which can usually only be obtained near conditions of stall at reduced stall margins.

Active management of the incipient stall process would make it possible to reduce the stall margin during operation. However, prior techniques that attempt to successfully manage the stability of the compressor section have used sensors (e.g., Kulite® sensors) that have proved incapable of surviving the harsh operating environments typical of full-scale compressors (e.g., the operating conditions found in jet-engines). In particular, heat and vibration typically contribute to an almost instantaneous destruction of the sensors.

DETAILED DESCRIPTION

Figure 1:
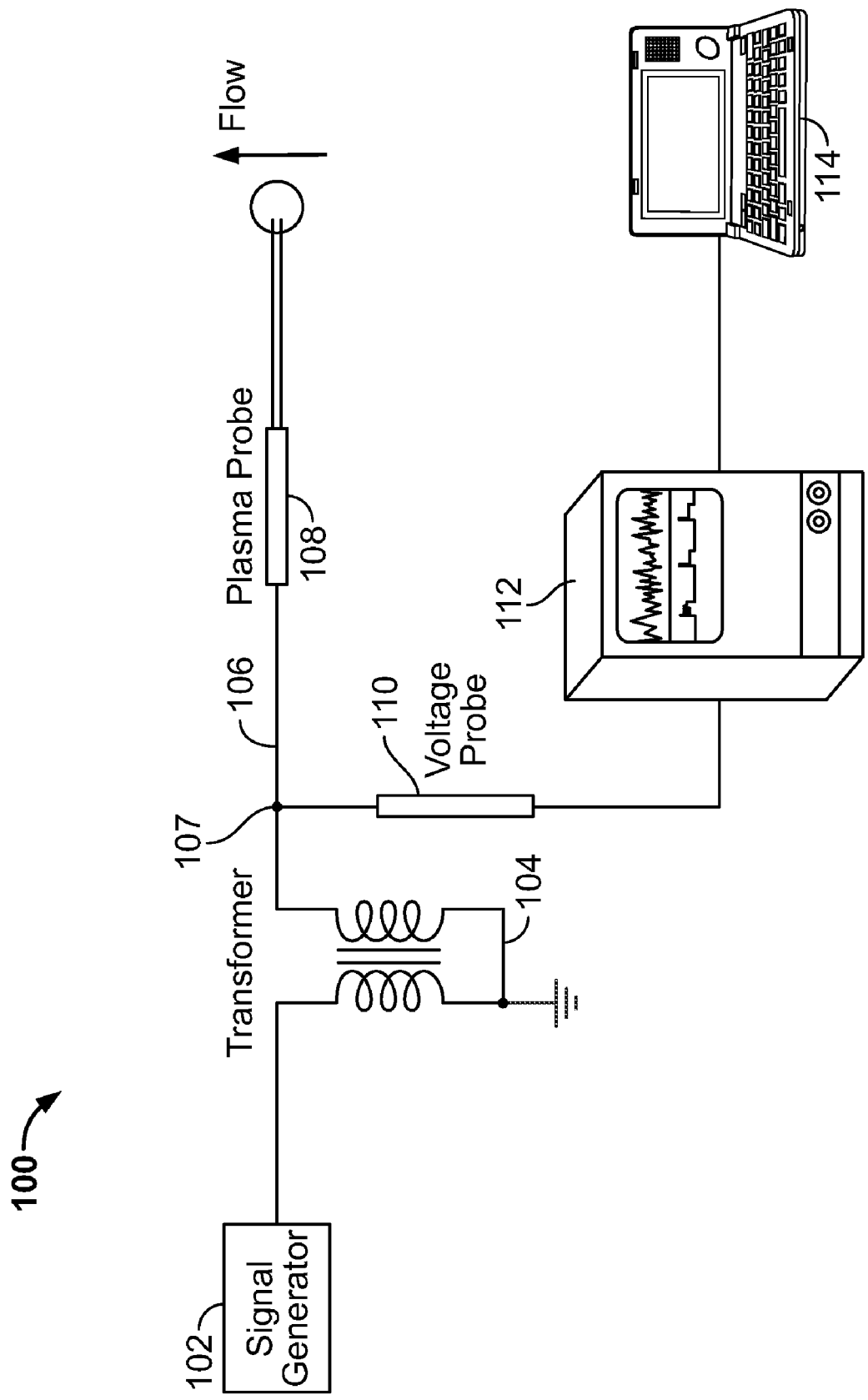
FIG. 1 illustrates an example plasma sensor system.

The following description of the disclosed examples is not intended to limit the scope of the disclosure to the precise form or forms detailed herein. Instead the following description is intended to be illustrative of the principles of the disclosure so that others may follow its teachings. It will be appreciated by one of ordinary skill in the art that while the disclosed examples are directed to a compressor casing for a gas turbine engine, the disclosed sensors may be utilized to provide stall or surge warnings for any suitable axial flow device, including, but not limited to, fans, turbines, pumps, jet engines, high speed ship engines, power stations, superchargers, low pressure compressors, high pressure compressors, and/or any other application. In addition, as used herein, the term "sensor" may refer to a plasma sensor system, plasma sensor, plasma probe, plasma anemometer, etc. Also, "plasma" and "glow discharge" are used interchangeably throughout this disclosure.

Compressor sections of gas-turbines are subject to stall when the mass-flow through the system falls below a critical value. Precursors to compressor stall may exist in the form of transient short-wavelength disturbances in the unsteady pressure in the tip-gap region of the compressor rotor. These precursors contribute to a reduction in the per-rotation coherence of a blade pressure signal, which can be an indicator of incipient stall. A warning of stall can be obtained during operation by performing real-time statistical auto-correlation measurements of the blade-passing pressure signal near the mid-chord location of the rotor.

Active management of the incipient stall process would make it possible to reduce the stall margin during operation. The stall margin can be reduced by analyzing the time-resolved pressure history of a compressor section, which, as detailed below, utilizes a real-time auto-correlation of the time-resolved rotor-tip pressure signature. The per-blade coherence of the blade-passage pressure signature is monitored to compute a correlation index whose value varies in relation to the loading on the rotor blades. During operation conditions in which the compressor is lightly loaded, the coherence in the pressure signal is high and near unity. However, as the loading on the compressor blades is increased the pressure signature of the blade passing becomes more chaotic, which reduces the coherence measure when comparing one revolution to the next. This is caused by random disturbances in the pressure time series that increase as the compressor approaches stall. With the selection of an appropriate threshold in the correlation, it is possible to predict a stall before it occurs. With a stall predicted, it is possible to employ an active stability management process to enable an operator to take the necessary steps to avoid a stall.

The examples described herein are generally directed to an alternating current (AC) driven, plasma sensor (e.g., anemometer) for measuring flow disturbances at, for example, hypersonic Mach numbers. Flow disturbances may be, for example, pressure changes sensed adjacent to a flow path, velocity changes or any other disruption or change sensed in or from a flow. As provided in greater detail below, the example sensors described herein utilize an AC driven glow discharge or plasma discharge created in a small spatial volume between two electrodes that may be encapsulated as the primary sensing element. The plasma discharge is preferably driven by an AC power source, such as a low power (e.g., less than about 5 Watt) AC source. The plasma created at the electrodes interacts with disturbances in the flow that pass over or inside the gap between the electrodes, which can be detected by monitoring the time-resolved voltage drop across the two electrodes, this voltage change affects the amplitude of the AC carrier.

This time-resolved or time-varying, if unsteady, voltage drop or modulation can be correlated to the unsteady velocity, pressure or mass-flux characteristics in the external flow, depending on orientation of the sensor. The change in plasma voltage as the flow disturbance in the gap varies can be explained by the effect of the flow disturbance on the current-carrying particles in the electrode gap. The ionized and metastable species involved in the glow discharge experience a drag force in the direction of the flow disturbance. This drag will collectively deflect the trajectory of the plasma particles towards the downstream edge of the electrodes as they traverse the gap. Some of these particles may be swept out of the gap entirely, at which point they no longer contribute to the current flow in the device. This is registered as a rise in voltage. The frequency response of the sensor is quite high (for example 15 MHz) and is determined by the ion mobility of the plasma in the gap. The frequency bandwidth is set by the AC carrier driving the plasma discharge, as modulation of a carrier cannot occur at a frequency higher than the carrier. In other words, as the glow discharge may include ionized gas particles that have high mobility, the effective mass of the sensing element in the sensor is quite low, which enables a frequency response in excess of, for example, about 15 MHz and is effectively limited only by the frequency of the AC waveform used to create the plasma. Also, as there are no moving parts, these example sensors feature a high level of mechanical robustness.

In addition, some examples of the plasma sensor include one or more of the following additional advantages: the example sensor requires no frequency compensation up to its AC carrier frequency, the example sensor has an amplitude-modulated output that has excellent common-mode rejection with a signal-to-noise ratio that is improved over the output generated by hot-wire devices, and the example sensor does not include a sensor element that could easily break, the example sensor may have a small spatial volume, the example sensor is insensitive to temperature variations (i.e., temperature independent) making it easier to calibrate than thermal-based sensors, and the example sensor may be operated across a myriad of different pressures (e.g., from very low pressures such as in a vacuum to very high pressures). With respect to the temperature, in some examples, the sensors are impervious to high temperature up to the melting point of the electrode materials used, which if Iridium-based electrodes are used, is higher than 1800° C. The example plasma sensor(s) described herein can survive the vibration and temperatures of a full-scale compressor while providing the bandwidth necessary to resolve the blade passage signature required by the coherence technique described herein and while providing wireless capability, as detailed below. In addition, the example sensors described herein may have bandwidths in excess of 1 MHz for high-speed, high-enthalpy flows and do not require the use of external frequency compensation circuitry. Also, the example sensor, or plasma anemometer provides small spatial volume point measurements of velocity or pressure fluctuations with a frequency response that is unmatched by traditional sensors.

Further, the example plasma sensors may be used in a variety of applications and environments such as, for example, for measurements in a turbine (e.g., gas-turbine machinery), shock tubes, shock-boundary layer experiments, high-enthalpy hypersonic flows, in plasma tunnels, etc.

The example plasma sensor is successful in measuring important features of compressor stall. This includes the blade passage unsteadiness, the reduction in correlation that occurs before stall, the appearance of rotating stall cells as well as the full stall event in a transonic axial compressor. The unsteady voltage characteristics compare favorably with respect to the dynamics of the compressor stall, as discussed below.

The example plasma sensor also has the ability to transmit the voltage signal wirelessly, as mentioned above. This capability is due to the fact that the sensor is driven with a high-voltage AC waveform. This waveform naturally broadcasts electromagnetic energy which can be captured with a suitably designed antenna. This offers the possibility of implementing an in-situ measurement device that could be used in a gas-turbine compressor for stability management without the need to feed wires out of the engine; the signal could be broadcast wirelessly to an AM antenna mounted on the compressor casing.

The example sensors provide the path to implementations of stall prediction and stability management on full scale flight sized compressor sections typical to those used in aero jet-engines. The example sensors can survive the mechanical and thermal stresses encountered in a full size gas-turbine engine while providing the bandwidth necessary to resolve the transient pressure signature that can provide prediction of compressor stall. This predictive warning enables the implementation of a stability management system that allows the compressor to be operated much closer to the stall margin, thus increasing the operating efficiency of the compressor.

One example method described herein includes a method for predicting an event including providing a carrier signal across two electrodes and forming a plasma between the two electrodes. The example method also includes measuring a modulated signal from the plasma, manipulating the modulated signal to produce a value and comparing the value to a threshold. Finally, the example method includes determining the likelihood of the event based on the comparison.

An example plasma sensor system described herein includes a carrier signal generator, two electrodes and a plasma between the two electrodes formed by applying the carrier signal across the two electrodes. The example system also includes a probe to measure a modulated signal from the plasma and a processor to demodulate the sensor output to produce a signal that can be used in an auto-correlation scheme that gives a pre-cursor of an imminent event. In the example described herein, the event is a stall event. However, in other examples, the event may be a surge, flow oscillation, flow reversal, etc.

Furthermore, an example plasma sensor described herein includes means for capturing evidence of a flow disturbance across two electrodes and means for manipulating the evidence to produce a value indicative of the incipience of an event such as, for example, compressor stall.

FIG. 1 illustrates an example plasma sensor and system 100, which, in this example is shown as an alternating current (AC) plasma anemometer. However, other examples may include other types of sensors and/or a direct current (DC). The example plasma sensor includes a signal generator 102, a transformer 104, a cable 106, a plasma probe 108, a voltage probe 110, a signal measurement device 112, and a computer 114. The signal generator 102 may be any type of suitable system for generating a periodic voltage or current signal, such as, for example, an AC signal. In addition, the signal generator 102 may be, for example, a solid state amplifier that may be computer controlled and which contains an internal oscillator for signal generation, but can also accept an external signal source. When an external signal source is used, an external signal source port (not shown) may be used for receiving a signal from a signal generation device that is then amplified by the amplifier.

The transformer 104 may be any type of transformer, such as, for example, a high-frequency step-up transformer. The operating frequency of signal generator 102 is chosen so that in operation it places signal amplifier 102 and transformer 104 in a "resonant" mode characteristic of a tank-circuit. This operating frequency will hereinafter be referred to as the carrier frequency, fc. In one example, the transformer 104 resonates at a frequency of approximately 800 kHz or greater. For example, the transformer 104 has a resonant frequency of either 1 MHz or 2 MHz; however in other examples, other frequencies may be used.

As described in further detail below, the signal amplifier 102 and the transformer 104 generate a high voltage AC signal at frequency fc. The generated AC signal may have any of a variety of waveforms such as, for example, sinusoidal, square, triangular, saw tooth, etc. Because a sinusoidal waveform typically produces fewer harmonics than other waveforms, the example generated AC signal described herein is a sinusoidal waveform.

The example plasma probe 108 includes two closely spaced electrodes and is connected to the transformer 104 via a cable 106. The example cable 106 is capable of carrying high voltage signals. The AC signal is provided, via the cable 106, to the plasma probe 108 and a plasma discharge is generated between the two electrodes. A more detailed description of the example plasma probe 108 is provided below.

The example plasma sensor 100, which, as illustrated, includes the signal generator 102, the transformer 104, the cable 106 and the plasma probe 108, represents an RLC circuit, with the resistance, R, and the capacitance, C, represented by the plasma probe 108 and the cable 106, and the inductance, L, represented by the transformer 104. Thus, the overall impedance of the system is frequency dependent and has an optimum frequency (i.e., the resonant frequency) at which the output voltage will be a maximum. Operating the circuit at this resonant frequency greatly helps in achieving sufficient voltage to initiate a plasma discharge between the electrodes of the plasma probe 108. Additionally, in this example, the transformer 104 has a resistance much greater than the resistance of the cable 106 and the plasma probe 108. This results in the delivery of a constant current to the plasma probe 108 while plasma forms between the electrodes of the probe 108 regardless of variations in the resistance across the plasma probe 108 during operation of the system 100. Small variations in the current may occur in such a constant current system. Thus, as used herein, the term "constant current" means that the current is substantially constant while small variations in the current may exist.

In operation, the example plasma system 100 is tuned to resonate by adjusting the frequency of the signal generator 102. When tuned, the power drawn by the plasma probe 108 is less than approximately 5 Watts. Because the voltage of the system drops dramatically at frequencies other than resonant frequency, the length of the cable 106, in this example, is kept to a minimum to avoid capacitance losses that may reduce the resonant frequency of the system. Further, in some examples, the system may be monitored in real-time to ensure that the system remains in resonance. This may be accomplished manually or by, for example, hardware and/or software that monitors the system and automatically adjusts the frequency of the signal generator 102 to ensure the system remains in resonance.

The example plasma sensor 100 also, as illustrated, includes a voltage probe 110 that measures the output of the plasma probe 108. The illustrated example voltage probe 110 is connected to the cable 106 at a "T" junction on the cable 106 and also to a signal measurement device 112. Because the voltage is very high in the illustrated example, a 1000:1 high-voltage high-bandwidth probe may be used to reduce the voltage so as not to harm the signal measurement device 112. Further, in some examples, an AM receiver may be used in place of the voltage probe 108 to take advantage of the AM transmission characteristics of the generated plasma, as described below.

The signal measurement device 112 may be any device capable of acquiring a waveform. For example, the signal measurement device 112 may be an oscilloscope, such as a digital oscilloscope, a digital radio like device (e.g., a GNU radio), or other hardware, software, and/or firmware capable of acquiring the waveform of the signal on the cable 106.

In operation, the signal measurement device 112 acquires the waveform of the signal on the cable 106 and transfers the waveform to the computer 114, which analyzes the acquired signal. The computer 114 may be, for example, any standard processor based system, such as, but not limited to, a laptop computer, a desktop computer, a workstation, a hand held computer, etc. Additionally, rather than employing a separate signal measurement device 112 and computer 114, in some examples these devices are combined into a single device. The combination of the signal measurement device 112 and the computer 114, whether as separate or in a combined device, will hereinafter be referred to as the signal analysis system.

Figure 2:
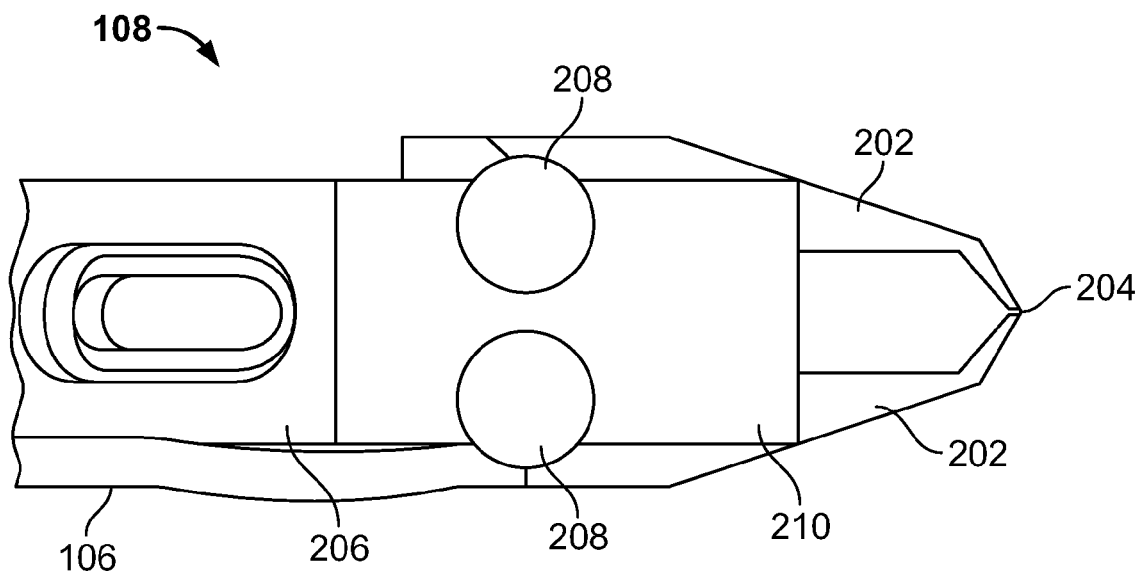
FIG. 2 illustrates a more detailed diagram of a plasma probe portion of the example plasma sensor system of FIG. 1.

FIG. 2 illustrates a detailed view of the example plasma probe 108 of FIG. 1. As illustrated, the example plasma probe 108 includes two electrodes 202 separated by a small air gap 204. In this example, the electrodes 202 are very thin, such as for example, less than approximately 0.1 mm. In some examples, the electrodes 202 are photo-etched by a conventional chemical milling process out of 0.457 mm (0.0018 in.) stainless hardened steel. Using a chemical milling process may help to ensure a precise geometry of the electrodes, which increases the accuracy of the resulting measurements. Additionally, the electrodes 202 may be manufactured from a variety of materials, such as, for example, stainless steel, tungsten, platinum, or any other suitable material.

The electrodes 202 may also be coated with a dielectric material to reduce the likelihood that plasma formed between the electrodes 202 during operation of the system will sputter (e.g., vacillate or otherwise fluctuate). This may also aid in improving the life of the electrodes 202 and the accuracy of the measurements. An example dielectric coating may be a very thin coating of, for example, approximately 1-3 microns and may be applied in an evacuated chamber as is well known to those of ordinary skill in the art. Further, the dielectric coating may be, for example, an oxide layer, such as, for example, silicon dioxide, or any other suitable material.

Figure 3:
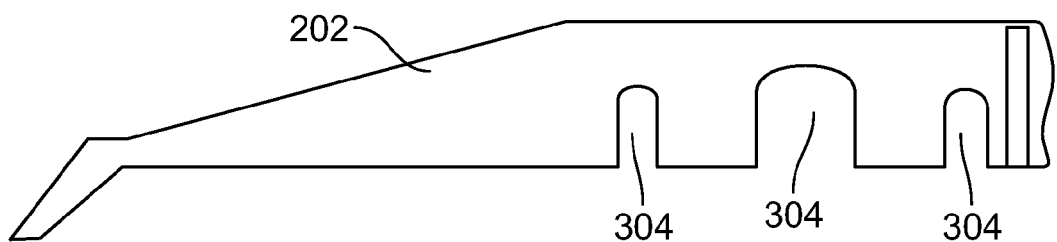
FIG. 3 illustrates a more detailed diagram of an example electrode included the example plasma probe portion of FIG. 2.

Further, the electrodes 202 may be fabricated as joined pairs that can be separated along a thinned section at the center. FIG. 3 illustrates a more detailed diagram of an electrode 202. In this example, each electrode is approximately 2.92 cm (1.15 in) in length, although in other examples, electrodes of longer and shorter lengths may be used. Further, the example electrodes 202 include cut-outs 304 to allow placement of locating screws that may be used to adjust the electrodes 202 and/or the gap 204.

Figure 4A:
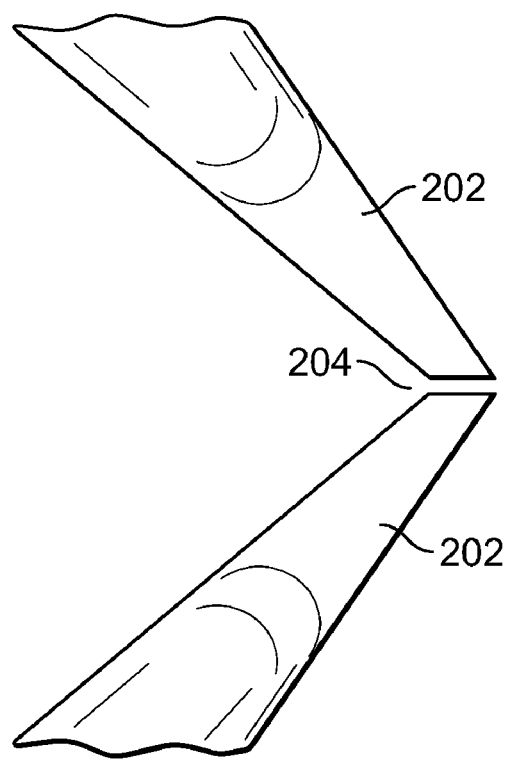
FIGS. 4A-4B illustrate enlarged views of the example electrode of FIG. 3, included in the example plasma sensor system of FIG. 1.
Figure 4B:
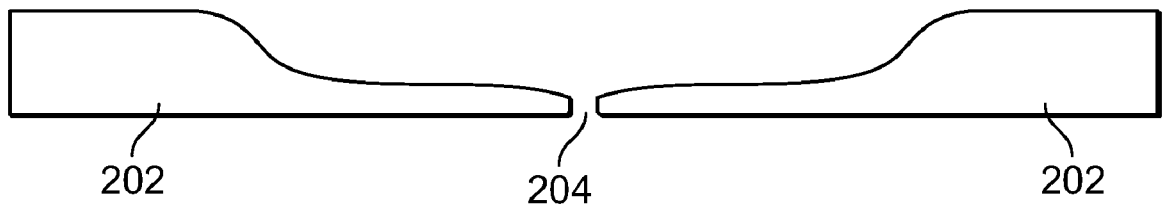

As shown, the electrodes 202 are inserted into a carrier or fixture 206 and fasteners 208 are used to secure the electrodes into place. The fixture 206 may be, for example, a plastic fixture or any suitable carrier and the fasteners 208 may be screw such as nylon screws or any other suitable mechanical or chemical fasteners. In some examples, the fixture 206 may be manufactured from a 1.27 cm (0.5 in) diameter plastic rod into which a 0.51 mm (0.02 in.) slot is cut to accept the electrodes 202, and the fasteners 208 pinch the sleeve to securely capture the electrodes 202. Further in some examples, the tips of electrodes 202 are etched to about less than half the thickness of the electrodes 202 by a milling process (e.g., about less than half of 0.457 mm) to reduce aerodynamic blockage in the region of plasma discharge. Further, in some examples, the electrodes 202 may be prepared for use by lightly sanding with 600 grit Emory paper along the section at the tip to remove any imperfections or contamination deposited during the chemical milling process, which may be accomplished by, for example, running a feeler gage encased in Emory paper back and forth in the gap so that the tips are substantially parallel to ensure an even and well-controlled discharge. Additionally, the example plasma probe 108 may be mounted on a sting in such a way that the general form factor is similar to a hot-wire sensor. FIGS. 4A-4B provide two enlarged views of the electrode tips and the gap 204. FIG. 4A illustrates a side view and FIG. 4B illustrates an end view.

The dimensions of the electrodes 202 may be of greater concern in some examples than in others. For example, in those examples in which changes in velocity in a flow path are measured, the electrodes 202 should have greater aerodynamic properties. In those examples in which the sensor 100 is disposed adjacent a flow path and flow disturbance such as, for example, pressure changes are measures, the aerodynamic properties of the electrodes 202 may be immaterial.

In the illustrated example, the gap 204 is set small enough to prevent plasma from escaping into the free-stream and "flap." This behavior may produce strong sinusoidal fluctuations and higher harmonics in the AC carrier that may saturate the signal to be measured and, thus, make it more difficult to obtain accurate information regarding the flow. Further, in this example, the power (amplitude) of the carrier signal for generating the plasma also is set to a low enough value to prevent plasma from escaping. In addition, in this example, the power (amplitude) of the carrier signal for generating the plasma is set high enough to prevent the plasma from turning off or operating in an intermittent fashion. Preventing plasma escape and intermittent plasma along with maintaining precise electrodes, such as those discussed above, helps to ensure both that the measured voltages are directly proportional to magnitude of the flow disturbance including, for example, the velocity of the flow, the pressure in or near the flow path or changes thereof, and that the measurements are repeatable.

The formation of plasma between the electrodes 202 is initiated by adjusting the frequency of the signal generator 102 to bring the system into resonance, which maximizes the output through the transformer 104. In this example, this is done by initially setting the signal generator 102 to a low input power level below the threshold necessary to start the discharge. The power of the signal generator 102 is then increased to the point where a glow-discharge is formed. Depending on the gap size and pressure, this initiation voltage may be, for example, in the range of about 700-1000 $V_{rms}$ (root-mean-square) as measured by the voltage probe 110. In some examples, after the plasma has initiated, the input power may be reduced slightly on the amplifier because the power required to sustain the plasma is less than the power required for initiating plasma formation. Further, as discussed above, after generation of the plasma, too large of a voltage may result in the plasma escaping, thus making it more difficult to obtain accurate flow measurements.

In this example, once the plasma has started, the voltage across the electrodes 202 instantly drops (e.g., to about as low as 330 $V_{rms}$) due to the current from the flow disturbance flowing through the plasma. During operation, the voltage varies between these two limits (i.e. approximately 700-1000 $V_{rms}$ and 330 $V_{rms}$ in this example) depending on the magnitude of the flow disturbance including, for example, the velocity of the flow, the pressure in or near the flow path or changes thereof. Further, in some examples, the plasma and voltage amplitude are monitored to ensure the plasma between the electrodes 202 of the plasma probe 108 is continuous. For example, if the voltage is allowed to drop too low, the plasma may sputter or become intermittent, which may make it more difficult to obtain accurate flow measurements. Further, as discussed above, if the voltage becomes too large, the plasma may escape which may also make it more difficult to obtain accurate flow disturbance measurements. This may be accomplished by, for example, a person or hardware, and/or software monitoring the plasma and adjusting the amplitude of signal generator 102 as necessary to ensure continuous plasma while also ensuring the plasma does not flap.

Figure 5A:
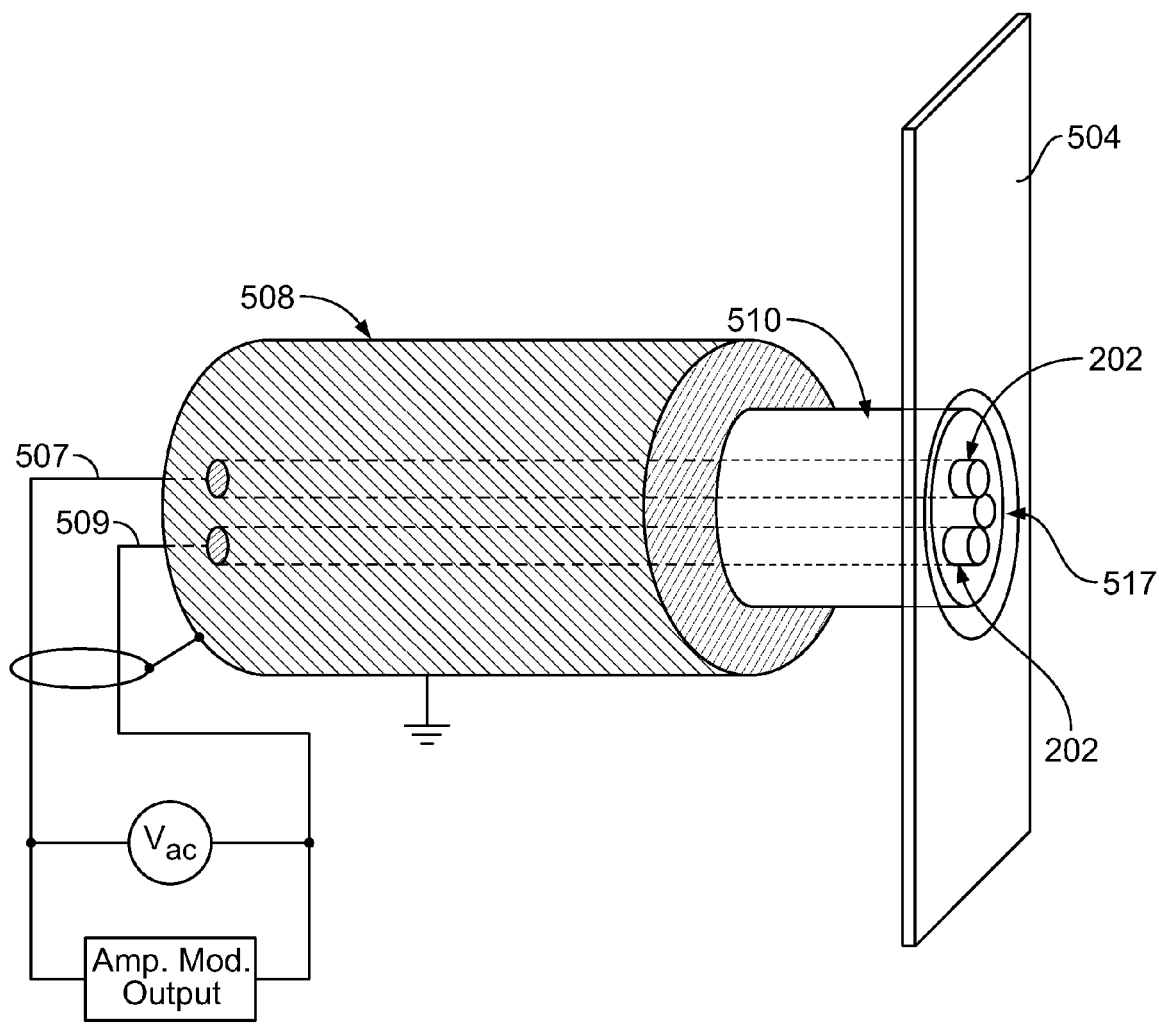
FIG. 5A shows a portion of the example plasma sensor of FIG. 1 embedded in an example casing.
Figure 5B:
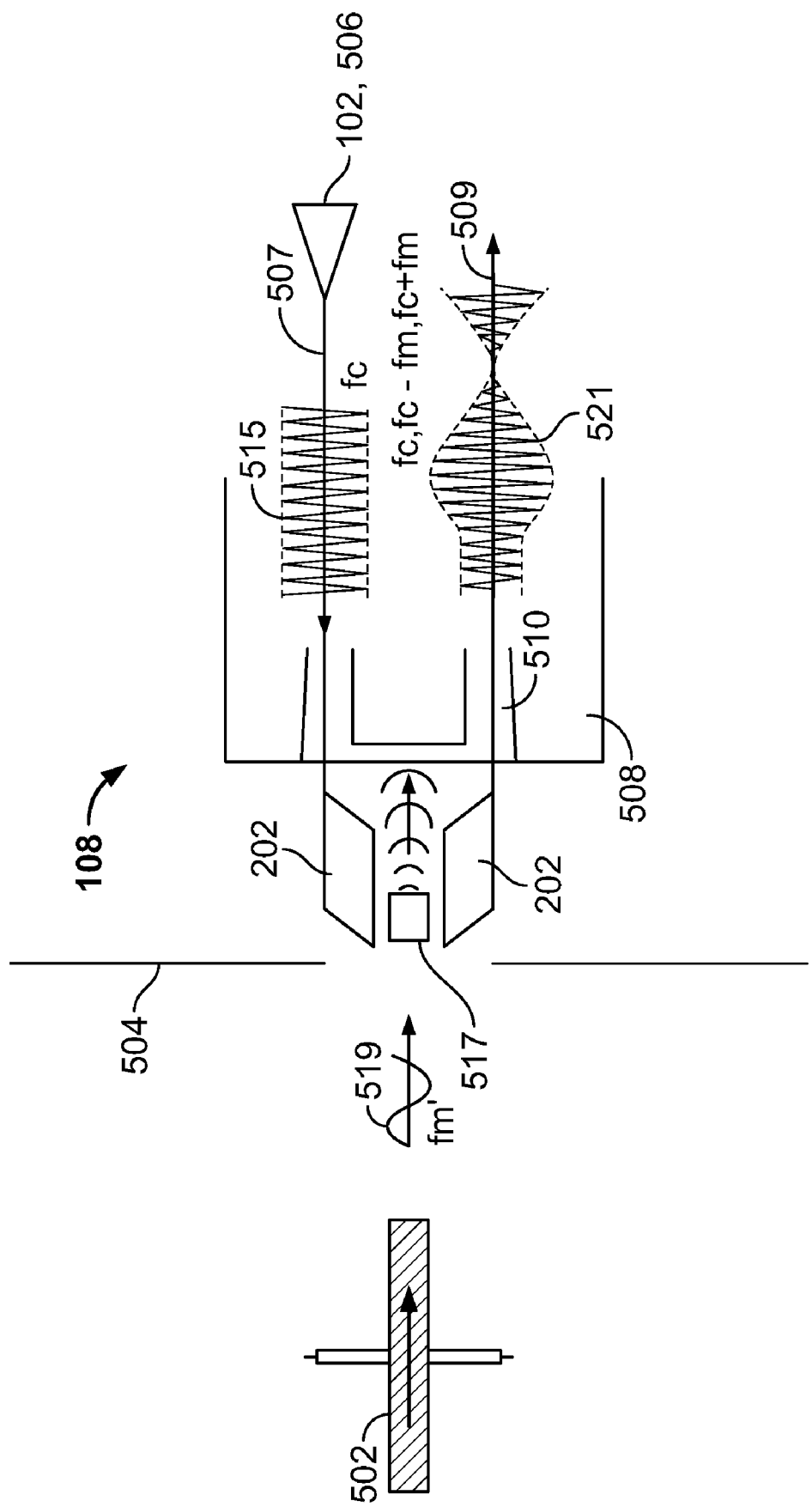
FIG. 5B is a view similar to FIG. 5A showing an example rotor and example carrier and modulated signals.

FIGS. 5A and 5B shows the example plasma probe 108 in proximity to a compressor rotor 502 and flush with or recessed from a turbine or rotor casing 504. For example, the sensor and the probe 108 in particular, may be flush-mounted to the inner wall of the casing 504 at a location just above a blade row of the turbine. In this configuration, the sensor can measure pressure variations as described herein in close proximity to the rotating blades without interfering with or being destroyed by the blade rotation.

There are other advantages that are particularly appreciated in the harsh environment of a jet engine. For example, the example, plasma sensor can perform at extreme temperature including, for example, as high as 1335° C. (2400° F.). In addition, in some examples the plasma probe may include an outer casing 508 that houses the conductors, i.e., wires 507, 509, which are encapsulated by an insulator 510. In some examples the insulator 510 may include protective outer metallic sheath covering an insulating ceramic powder such as, for example, MgO. The ceramic powder 510 prevents the two wires 507, 509 from shorting during operation. The electrode pair 202 is formed by the two conductors 507, 509, which as noted above, may be spaced about 0.15 mm (0.006 inch) apart. The junction at the end may be cut and the 507, 509 conductors ground flat using a fine file as noted above. The example probe 108 may be placed in a casing. The casing and, thus, the sensor and probe may be any size including, for example, sized to be placed in a 12.7 mm (0.5 inch) deep tapped hole sized to accept a 6-32 screw, which is roughly 5.4 mm (0.137 inch) in diameter. In addition, in some examples, the components may be constructed with microelectromechanical systems (MEMS).

In the example of FIG. 5A, the plug end of the outer casing 508 was used to connect the device to the AC generator 102. In particular, one lead is connected to the high voltage, and the other is grounded. Though the plasma probe 108 may be operated with a wide variety of control parameters, in one example, the device is operated with a 2 MHz carrier signal of roughly 350 $V_{rms}$ at a power level of roughly 1 Watt, with a maximum of about less than 5 Watts. The frequency of the carrier signal determines the frequency response of the device. The practical upper limit is determined by the mobility of the ions in the discharge, which is on the order of about 15 MHz. The voltage at the tip may be monitored by reading the voltage at the plug on the lead carrying the AC waveform. It is also possible to read the sensor output wirelessly. This is possible because of the strong electromagnetic fields are emitted from the high-voltage lead near the electrode pair 202. This field can be easily captured with a suitably designed antenna and offers the potential to simplify wiring of in-situ measurements inside the compressor section.

The example plasma sensor works on a principle of amplitude modulation. The voltage drop across the electrodes 202 is modulated by the disturbance in the airflow that passes through the discharge region. This behavior represents an advantage of the sensor, as amplitude-modulated waveforms are resistant to signal contamination by common-mode noise. The details of the waveform showing the modulation characteristics are shown in FIG. 5B. As shown in FIG. 5B, the AC waveform flows into the electrode pair 202. The top wire 507 shows the incoming AC waveform 515. The AC waveform forms the plasma 517 between the electrodes 202 and is modulated by the incoming flow disturbance 519.

Figure 6A:
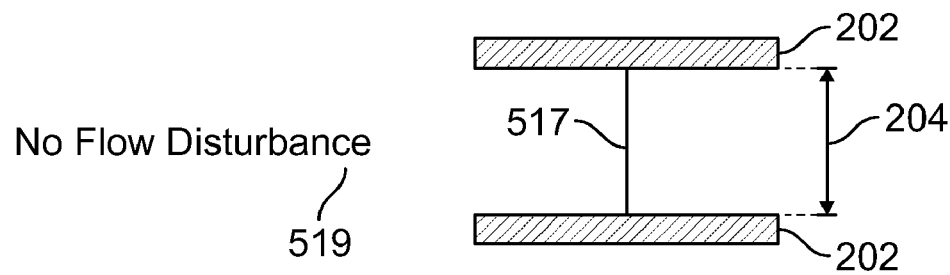
FIGS. 6A-6D illustrate example plasma discharges between two electrodes in the presence of different example flow disturbances.
Figure 6B:
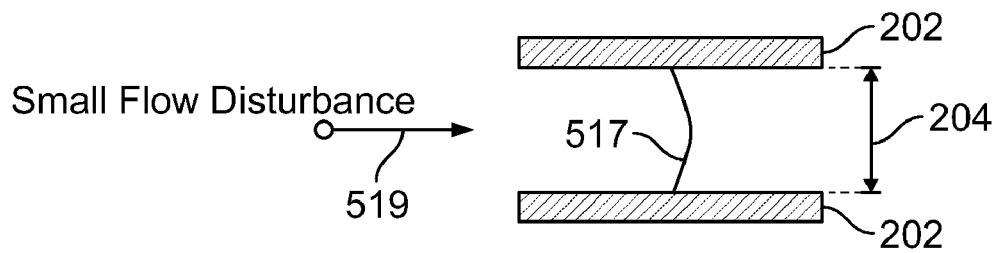
Figure 6C:
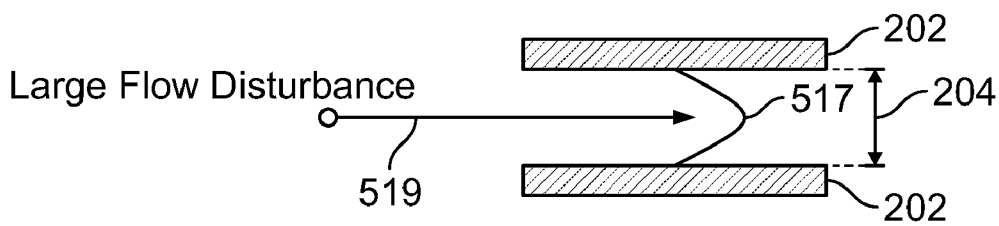
Figure 6D:
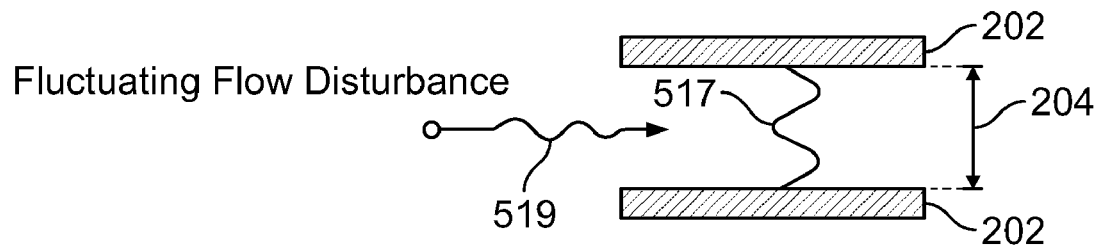

FIGS. 6A-D illustrate an example effect a flow disturbance between the electrode pair 202 has on the plasma 517 generated by an AC waveform 515 for different flow disturbances 519. As shown, FIG. 6A illustrates a plasma 517 formed between electrodes 202 in the presence of no flow disturbance 519; FIG. 6B illustrates the plasma 517 between electrodes 202 in the presence of a small flow disturbance 519; FIG. 6C illustrates the plasma 517 between electrodes 202 in the presence of a large flow disturbance 519; and FIG. 6D illustrates the plasma 517 in the presence of a time-dependent fluctuating flow disturbance 519. As noted above, a flow disturbance may be a velocity, a pressure or any other force, stress, interference, etc or changes thereof.

The flow disturbance 519 may cause ions to be driven out of the gap 204 causing the current density to increase to maintain a constant current, which in turn forces the voltage driving the plasma to increase. This voltage increase is directly measurable and may be correlated to a change in pressure and, thus, a change in flow velocity, pressure or other disturbance. Further, as illustrated, larger flow disturbances may cause plasma 517 to be deflected in gap 204. For example, plasma 517 "stretches" in response to increases in mean flow disturbance 519 and "vibrates" in response to time-dependent fluctuations in the flow disturbance 519, as shown in FIG. 6D. These time-dependent fluctuations may be modeled as sinusoidal signals with a disturbance frequency, fm.

It is possible to draw an analogy between the plasma 517 in gap 204 and a variable resistor. For example, the root-mean-square (r.m.s.) voltage of plasma 517 varies with the magnitude of the flow disturbance 517 through the gap 204 as if a resistor was limiting the current across electrodes 202. That is, this "gap resistance" varies as the magnitude of the flow disturbance changes, thus changing the voltage drop across the gap 204. Thus, as the magnitude of the flow disturbance increases on average, the mean voltage output from plasma probe 108 increases. This voltage increase or decrease may then be measured and the average pressure, flow velocity, etc. calculated.

In addition to determining the average magnitude of the flow disturbance 519, the system also may be used to determine information regarding fluctuations in the flow disturbance 519 (e.g., periodic disturbances etc.). For example, as discussed above with reference to FIG. 6D, periodic flow disturbances 519 may cause plasma 517 to oscillate at a frequency, fm. This is also shown in FIG. 5B. In FIG. 5B, the bottom wire 509 shows the outgoing amplitude modulated AC waveform 521, which was modulated by the plasma oscillation. The carrier waveform responsible for creating the plasma is shown at frequency fc and is generated by an amplifier/generator. The disturbance 519 in the airflow, depicted as a periodic disturbance of frequency fm modulates the carrier to produce a classical amplitude modulated waveform with frequency content at fc, fc−fm, fc+fm.

Figure 7:
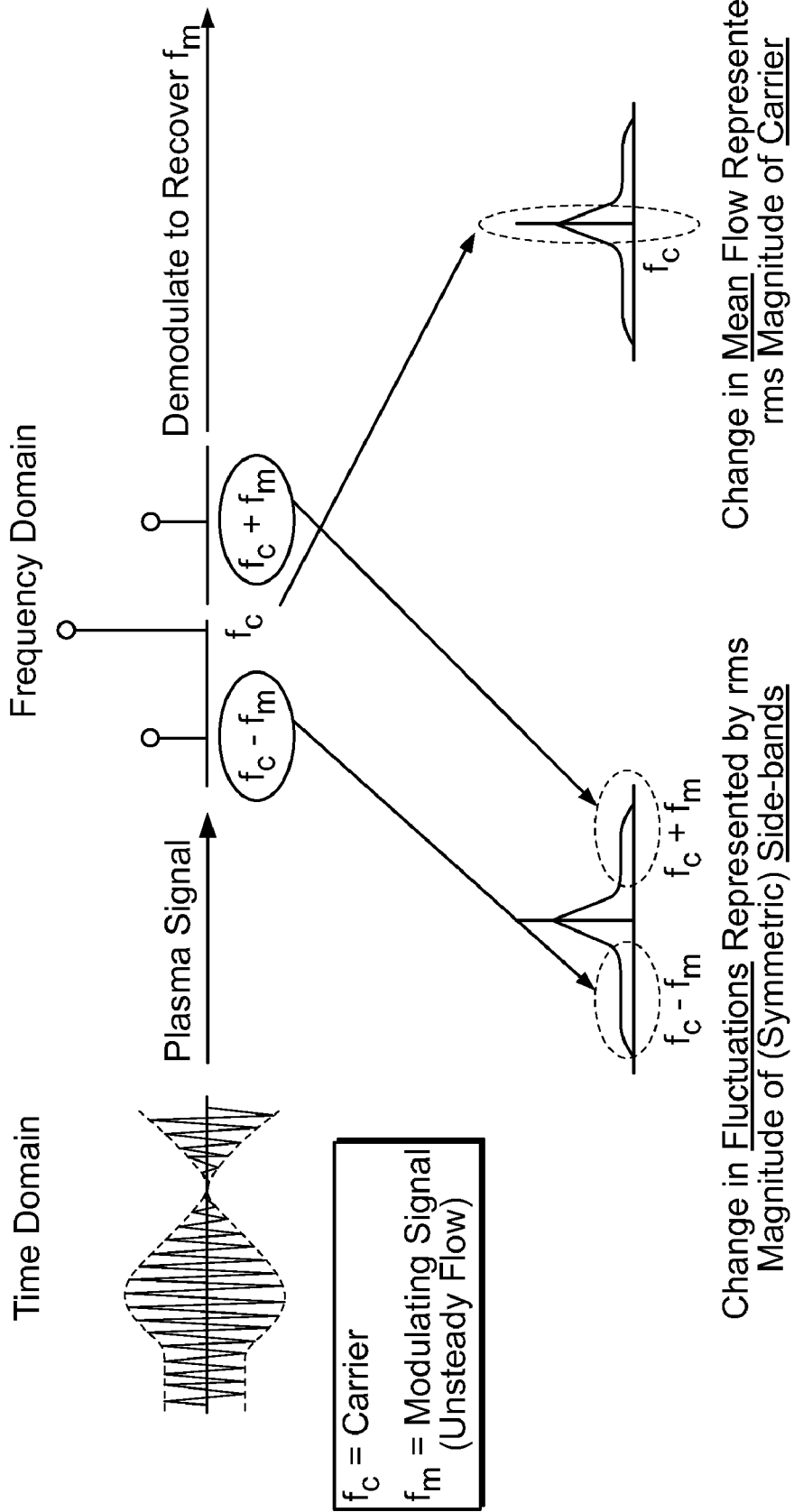
FIG. 7 shows a demodulation of the example modulated signal of FIG. 5B.

As shown in FIG. 7, to recover the information in the side-bands, the modulated signal must be demodulated. When this modulated signal is analyzed in the frequency domain, the disturbance frequency, fm will appear as two side-bands equidistant from the central peak at the carrier frequency, fc (i.e., at fc−fm and fc+fm). The information provided by the 'carrier' at fc represents the mean-state of the flow, whereas the time-resolved unsteadiness is carried by the so-called 'side-bands' at the difference and summation frequencies.

Figure 8:
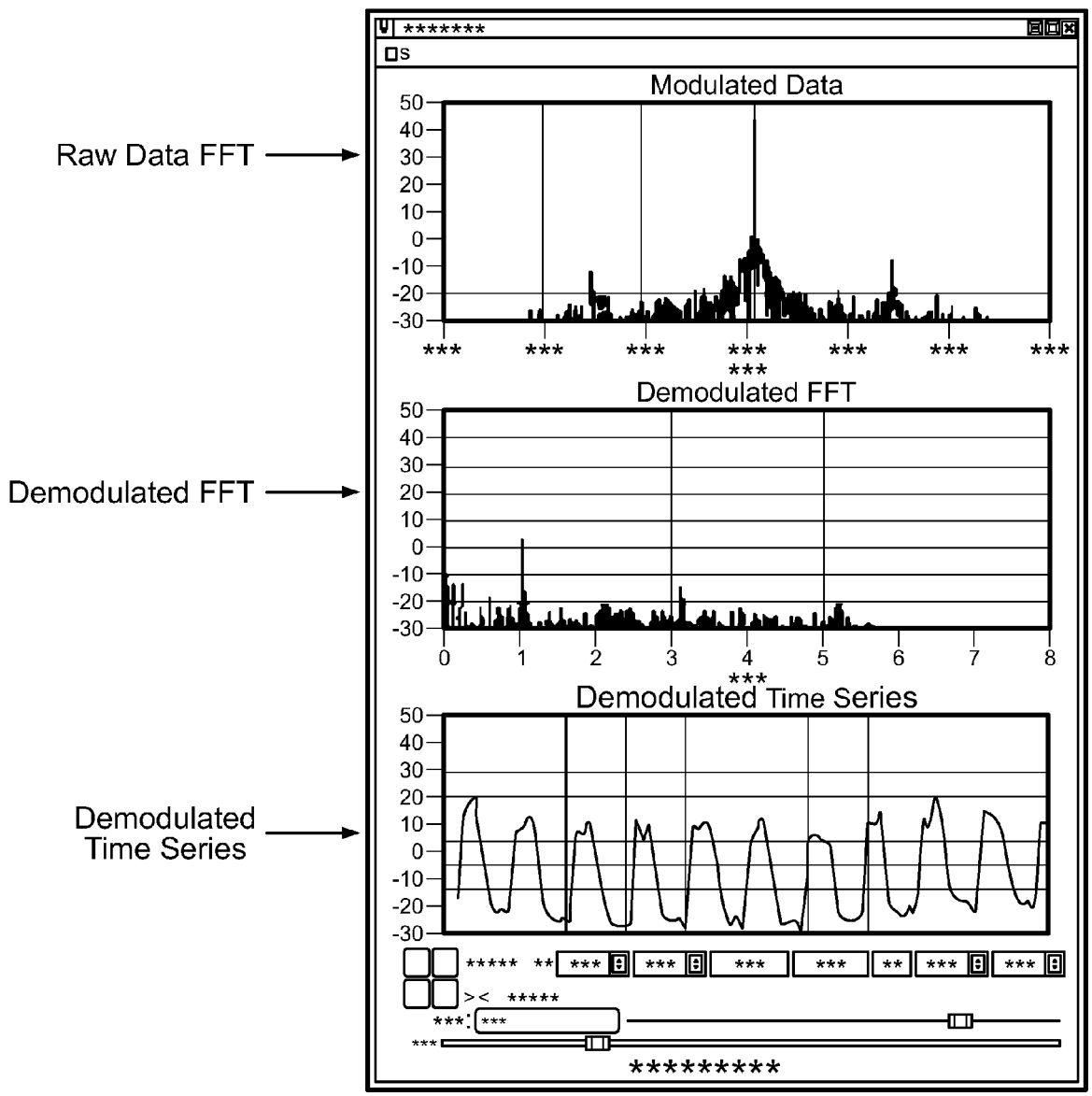
FIG. 8 is an example interface showing example processed signals.

The demodulation may be performed by an acquisition system that is designed to perform the digital signal processing in an efficient manner on, for example, a host PC (see e.g., FIG. 1) so that the modulating signal fm can be resolved in real time. This acquisition system may include software libraries and a hardware device known as the Universal Software Radio Peripheral (USRP), which performs the analog-to-digital conversion. The acquisition system provides a real-time graphical user interface (GUI) that may be used to monitor the performance of the plasma sensor. Different signal processing blocks can be 'wired' together in software to do various types of signal processing with the results shown on a computer screen. This can be seen in FIG. 8, which shows an image of an interface in which three plots are depicted: the top represents the spectrum of the modulated signal. The time series is demodulated in which the spectrum is converted to baseband (the middle plot). The interface shows the primary peak in the spectrum at 1 kHz along with the higher harmonics. The last figure is the demodulated time series, which looks much as it would with any traditional velocity or pressure sensor.

Figure 9:
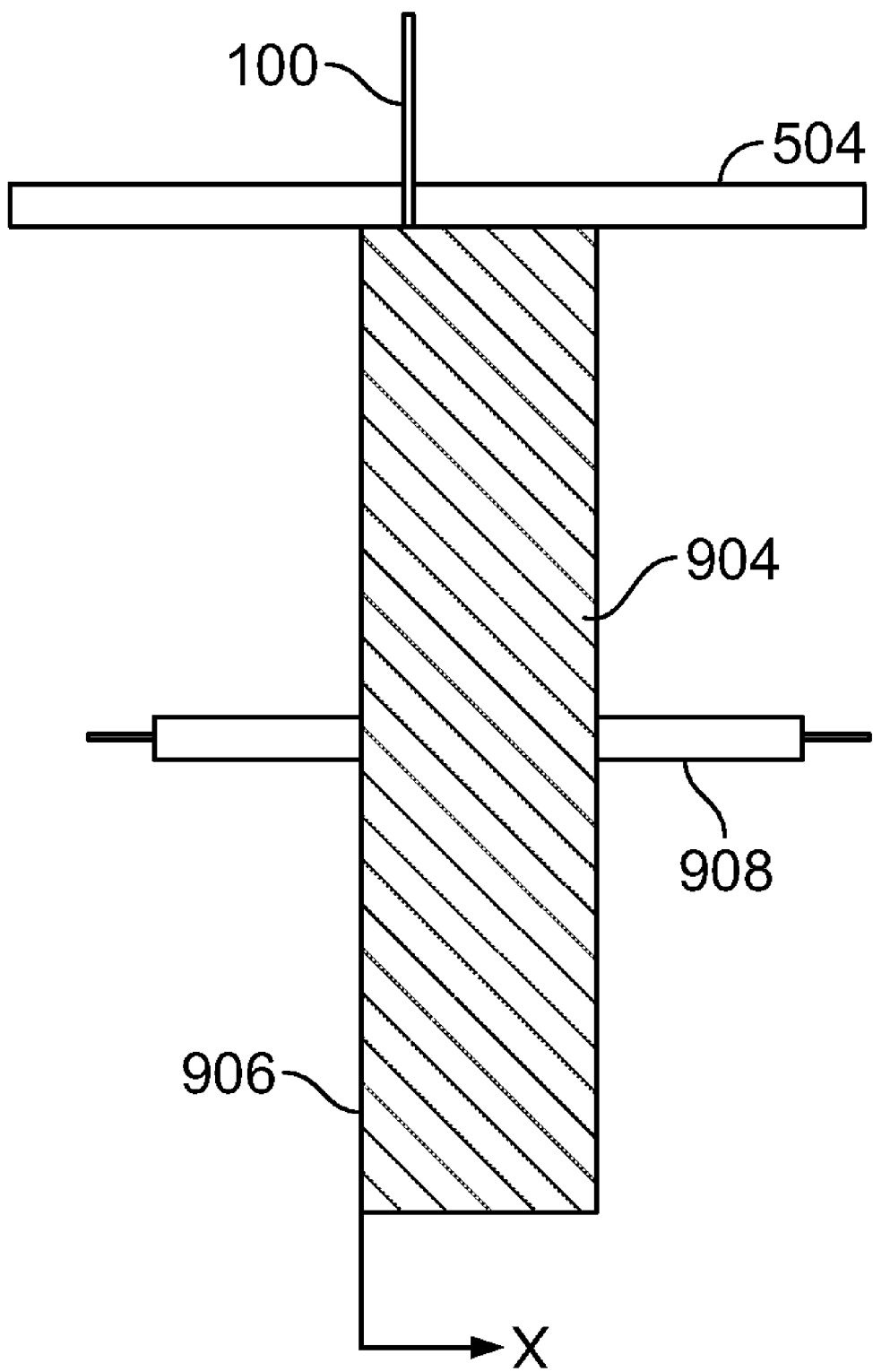
FIG. 9 is an enlarged view of a portion of the example plasma sensor system of FIG. 1 showing an example rotor and casing.

FIG. 9 shows the example plasma sensor 100 embedded in the casing 504 at a position downstream of a leading edge 906 of the rotor 904. The flow in this example is in the direction of the arrow, X. In this example, in particular, the position of the example plasma sensor 100 is 2.1% of chord length downstream of the leading edge 906. The plasma sensor 100 is positioned to observe maximum sensitivity to a stall inception that may occur between the leading edge 906 and a mid-chord 908 of the rotor.

To determine if the compressor is about to experience a stall, surge or other event, the example plasma sensor 100 measures the flow disturbance, e.g., the pressure periodically. The pressure values are manipulated through an algorithm to produce a correlation coefficient. The value of the coefficient is compared to a threshold value. For example, a decreasing coefficient may be due to the chaotic nature of the flow that occurs as the compressor approaches stall. The correlation is calculated from real-time statistical analysis from the over-the-rotor dynamic pressure sensors. This analysis computes a correlation measure based on the per-rotation coherence of the pressure signal, which is integrated over several blades. The integration time is user defined; too large a window and features are averaged out, while two small a window and the signal may be excessively noisy. In some examples, three to five blade passages may be used in a 20-blade system to comprise the integration window. The auto-correlation signal may be sampled at least ten times the blade passage frequency. One useful algorithm is Equation 1, shown below.

$$C(t) = \frac{\sum_{i=t-wnd}^{t}(P_i \cdot P_{i-shaft})}{\sqrt{\sum_{i=t-wnd}^{t} P_i^2 \cdot P_{i-shaft}^2}}$$ (Equation 1)

Where t is the current sample time, C(t) is the correlation measure as a function of time, i is the sample index, Pi is the measure pressure at time t=i, wnd is the correlation window size in number of samples, and shaft is the number of samples in one shaft revolution. The way the correlation is defined, the product of the pressure at a given time (Pi) and the pressure at exactly one rotation to the current rotation (Pi-shaft) are summed. The summation is performed over a window from t-wnd to t. This value is divided by the square root of separate summations over the individual products of Pi and Pi-shaft squared with themselves. This measure is done is real time and may be used as feedback to, for example, an engine controller.

The correlation measure is defined on the basis that the pressure-time trace obtained by a sensor, e.g., the plasma sensor 100, over the rotor-blades 502 will vary in its per-rotation repeatability when the compressor is nearing stall. By the definition provided above, the correlation index C(t) varies from 1 to −1, but by virtue of the behavior of the compressor the lower value is usually bound by 0. A value of 1 indicates a perfect repetition from one rotation to the next of the blade passage pressure signal. Likewise, values near 1 indicate that the system is operating away from stall the pressure signal and is mostly periodic. As the boundary of stable operation is approached, the periodicity is disrupted and the correlation measure decreases.

As noted above, wnd represents a window over which samples are averaged. This window can be any value up to the number of samples contained within one shaft rotation. However, a window this large would average out all the relevant and important transient information. Also, as noted above, a window that is too small will have a noisy calculated correlation. As noted above, in some examples the value is one that spans between about three to five blades.

Figure 10:
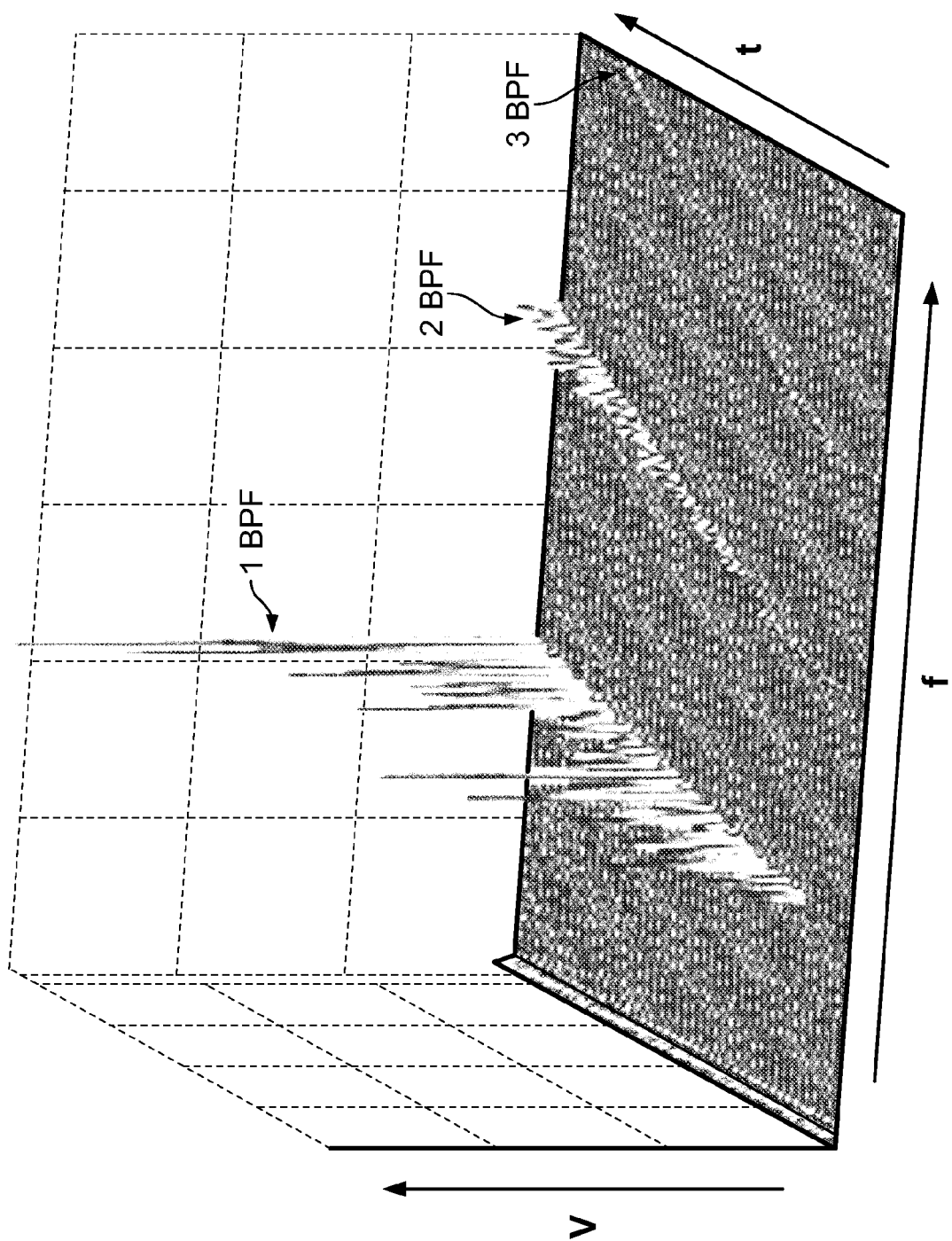
FIG. 10 is an example voltage spectrum plot showing an example blade-passage frequency.

FIG. 10 is a plot showing example blade passage frequencies (BPF). The data used in FIG. 10 was gathered from an example plasma sensor, which recorded time-resolved unsteady measurements of the pressure over the blade tips. The pressure was acquired at a rate of 256 kHz, well above ten times the blade passages frequency of less than 5 kHz. The blade passage pressure signature is a useful indicator of the performance of the plasma sensor 100. No filtering other than anti-aliasing at half the Nyquist frequency was performed for this data set. The plasma sensor 100 is clearly able to detect the blade-passage frequency, which begins near 2.5 kHz and increase to roughly 5 kHz as the compressor is spooled up to maximum speed.

Figure 11:
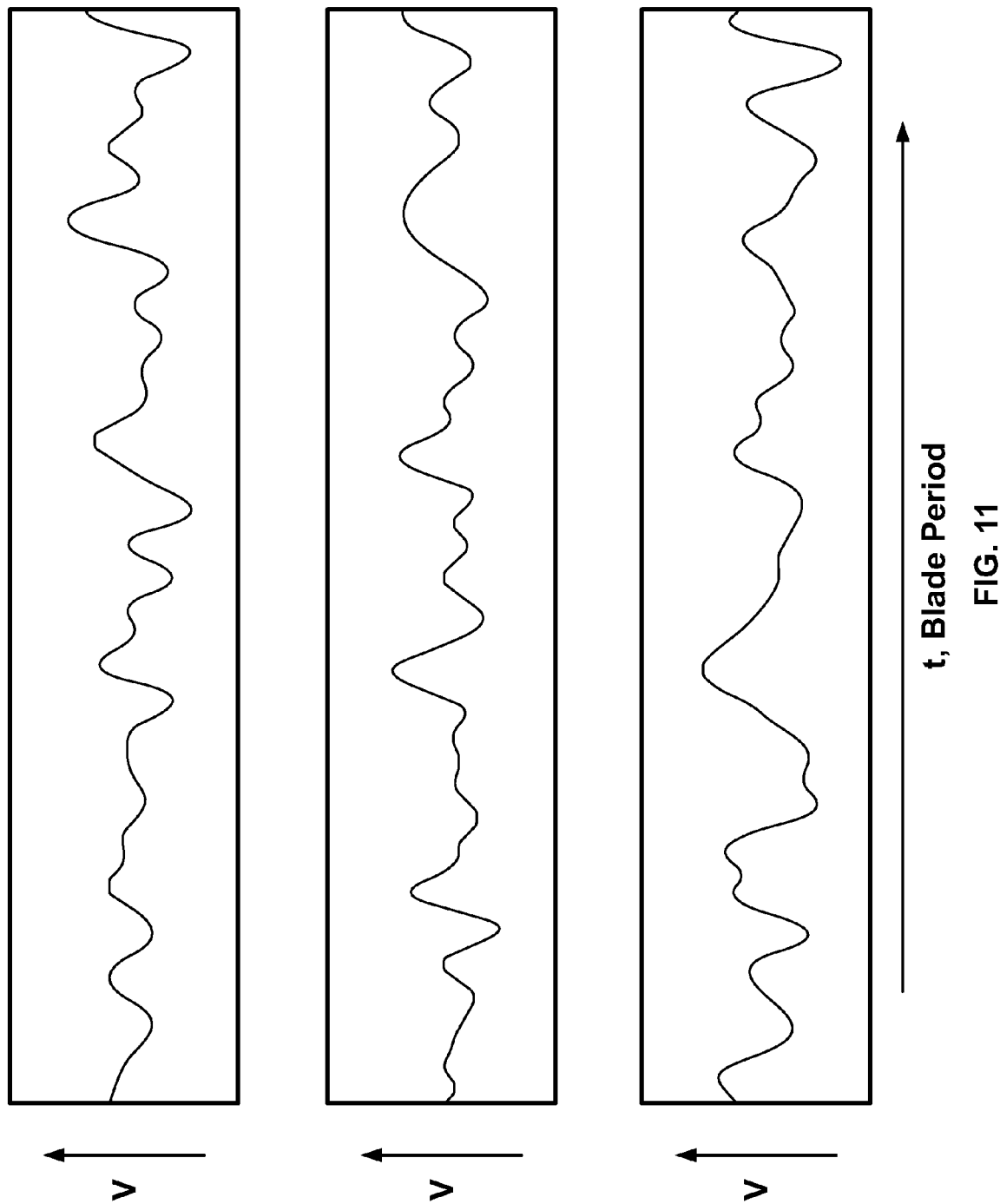
FIG. 11 is a plot of an example blade passage frequency.

Not only is the fundamental blade passage frequency resolved, but two additional harmonics of this frequency can also be seen. The pressure signal from individual blades can also be resolved, with the time-history of five individual blades over three sequential rotations shown in FIG. 11. The pressure signal is clearly repeatable from one rotation to the next when a particular blade is followed.

Figure 12:
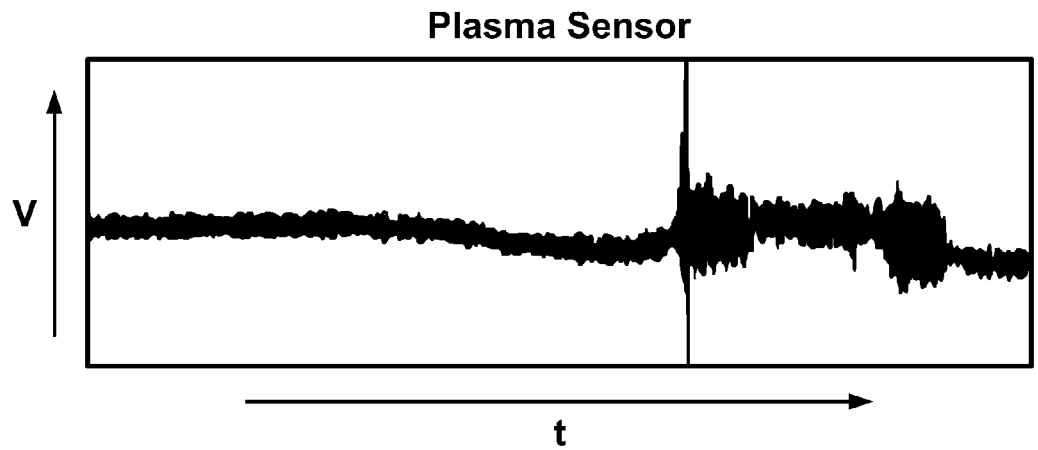
FIG. 12 is an example voltage plot showing an example stall.

FIG. 12 shows a voltage and time plot that illustrates a compressor that was throttled at an intermediate speed from non-stalled operation into transient stall and then back to a non-stalled state. The moment of stall is clearly shown as a large perturbation of the pressure signal, with large chaotic fluctuations. In fact, the exact moment of stall is determinable by the occurrence of a large spike, which possibly indicates a large-scale deflection of the plasma or even momentary extinction of the glow-discharge. This particular example represents a transient stall starting from 59% of maximum rotational speed.

Figure 13A:
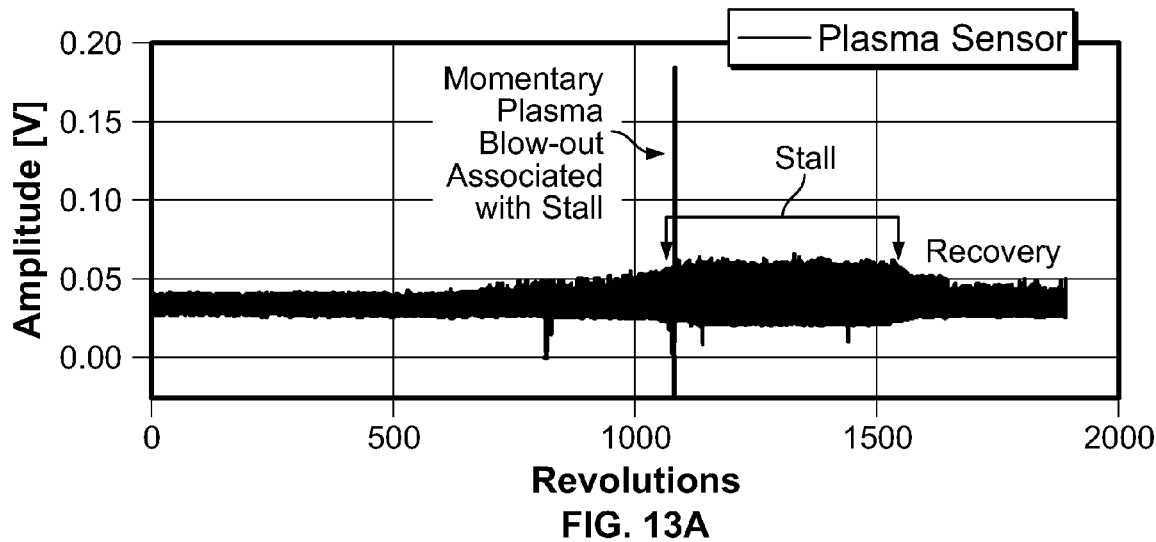
FIG. 13 shows an example voltage plot and example correlation index showing an example stall.
Figure 13B:
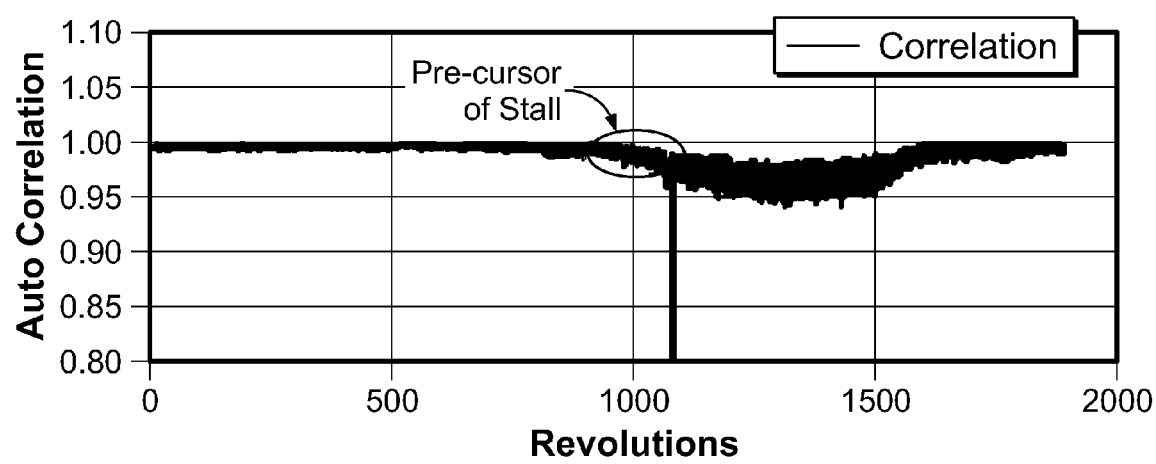

The per-rotation voltage auto-correlation is shown in FIG. 13. The top graph represents the voltage at each revolution or fractions thereof (i.e., per time) while the lower graph shows the correlation index at each revolution, or fraction thereof. As shown in the graph, it is clear that the correlation index decreases significantly during the stall. The value of the correlation before the stall event is near 1, and drops to 0.95.

Figure 14:
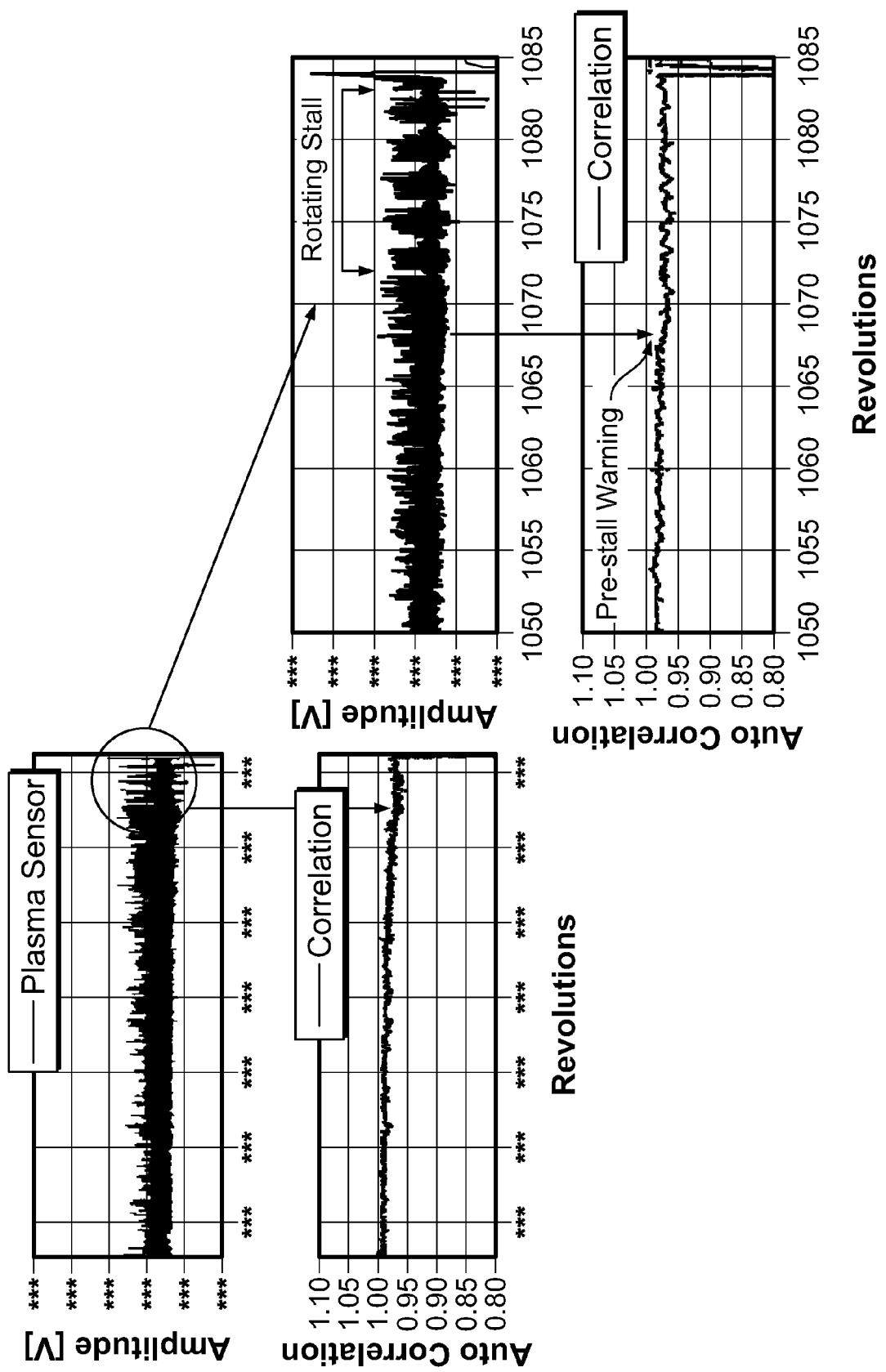
FIG. 14 shows an example voltage plot and example correlation index showing example rotating stall cells.

FIG. 14 illustrates that a transient short length-scale stall inception event is followed by the development of rotating stall cells, which are low-frequency disturbances in the voltage time series. These stall cells have a duration of approximately three cells in five rotor rotations, and these rotating stall cells grow rapidly in magnitude over the following rotations after the formation of the initial event and are fully developed within a few rotations after the onset of the stall inception event.

Closer inspection of FIG. 14 reveals a small dip in the correlation index before the stall occurred. This decrease in the correlation index, though slight, is seen between 5-10 revolutions before the appearance of the rotating stall cells. Thus, the example plasma sensor may forecast a stall and provide a warning in advance of the stall inception to implement a stall management system to avoid a stall. Such a system would make it possible to operate the gas-turbine closer to the stall margin while providing the feedback required by the control systems to implement corrective measures before stall fully develops.

Although the teachings of the present disclosure have been illustrated in connection with certain examples, there is no intent to limit the disclosure to such examples. On the contrary, the intention of this application is to cover all modifications and examples fairly falling within the scope of the appended claims either literally or under the doctrine of equivalents.

We claim:

1. A method of preventing an incipient stall of a fluid flow in an axial flow device comprising:
  mounting a plasma probe to an inner surface of a housing of the axial device, the housing of the axial flow device having an inner surface, an outer surface, a fluid inlet, a fluid outlet, and a plurality of blades rotatable within the housing;
  rotating the plurality of blades within the housing to create the fluid flow between the fluid inlet and the fluid outlet;
  generating a voltage to form a plasma, the plasma being exposed to the fluid flow;

detecting periodically at least one characteristics of the generated plasma;

measuring the characteristic of the generated plasma as the plasma is disturbed by the fluid flow;

identifying a variation in the measured characteristic of the generated plasma to predict the incipient stall of the fluid flow;

comparing the measured characteristic to a threshold to identify the variation; and modifying the rotation of the plurality of blades to prevent the incipient stall of the fluid flow.

2. A method as defined in claim 1, further comprising repeatedly measuring the characteristic of the generated plasma at a fluid flow below the incipient stall event to create the threshold.

3. A method as defined in claim 2, further comprising averaging the repeatedly measured characteristic over a predetermined time to create the threshold.

4. A method as defined in claim 1, periodically measuring the characteristic of the generated plasma for at least one individual blade of the plurality of blades.

5. A method as defined in claim 4, further comprising identifying a variation in the characteristic of the individual blade.

6. A method as defined in claim 1, wherein the periodically measured characteristic identifies at least one of the pressure, velocity, mass-flux, force, stress, or interference of the fluid flow.

7. A method as defined in claim 1, wherein the measuring of the characteristic of the generated plasma is performed by at least one of a voltage probe or an AM receiver.

8. A method as defined in claim 1, wherein the axial flow device is a gas turbine.

9. A method as defined in claim 1, wherein the processor is further configured to correlate the detected variation in the measured characteristic to a physical change in the fluid flow.

10. A plasma sensor for detecting a change in a characteristic of a fluid flow in a device comprising:

a plasma probe mountable in a housing having an inner surface, an outer surface, a fluid inlet, a fluid outlet, and a plurality of blades rotatable within the housing to cause a fluid flow proximate the inner surface, the plasma probe configured to generate plasma proximate to the plurality of blades and exposed to the fluid flow;

a signal generator to generate a signal to the plasma probe to cause the plasma probe to generate the plasma;

a detection probe to periodically detect at least one characteristic of the generated plasma;

a signal measuring device to measure the detected characteristic; and a processor configured to identify a variation in the detected characteristic of the generated plasma and provide an output indicating the change, wherein the processor identifies the variation in the detected characteristic of the generated plasma by comparing the detected characteristic to a threshold characteristic.

11. A plasma sensor as defined in claim 10, wherein the wherein the signal generator is adjustable to cause the plasma be in resonance.

12. A plasma sensor as defined in claim 10, wherein the processor is further configured to identify an incipient stall of the device.

13. A plasma sensor as defined in claim 10, wherein the threshold characteristic is determined by detecting the characteristic of the generated plasma at a fluid flow below the rated incipient stall of the device.

14. A plasma sensor as defined in claim 10, wherein the threshold characteristic is associated with at least one individual blade of the plurality of rotatable blades.

15. A plasma sensor as defined in claim 10, further comprising a stall management system to receive the outputted indication of the incipient stall of the device and configured to modify the operation of the device to avoid the stall.

16. A plasma sensor as defined in claim 10, wherein the processor is further configured to identify a physical change in at least one of the plurality of blades by identifying the variation in the detected characteristic.

17. A flow stall avoidance system comprising:

a flow device having a housing and a plurality of blades rotatable within the housing to cause a fluid flow within the housing;

a plasma probe adapted to receive an electric signal to generate a plasma, the plasma probe being mounted within the housing such that the generated plasma is influenced by the fluid flow;

an electric signal generator to generated the plasma;

a detection probe proximate the plasma probe to periodically measure a modulated signal from the plasma;

a signal measuring device to manipulate the modulated signal;

a processor to identify a variation in the manipulated signal and output an indication of an incipient stall of the axial flow device, wherein the processor identifies the variation in the manipulated signal of the generated plasma by comparing the manipulated signal to a threshold; and a stall management system to receive the indication of the incipient stall and to influence the operation of the flow device to avoid the stall.

18. A flow stall avoidance system as defined in claim 17, wherein the electric signal generator is tunable to cause the plasma to resonate.

19. A flow stall avoidance system as defined in claim 17, wherein the stall management system is configured to alter the flow conditions of the plurality of blades to avoid the stall.

20. A flow stall avoidance system as defined in claim 17, wherein the plasma probe is located proximate to the occurrence of stall cells.

* * * * *